United States Patent [19]

Hermann et al.

[11] Patent Number: 5,703,764

[45] Date of Patent: Dec. 30, 1997

[54] SWITCHED-MODE POWER SUPPLY HAVING STANDBY OPERATION

[75] Inventors: Wolfgang Hermann, Tennenbronn; Jean-Paul Louvel, Villingen-Schwenningen, both of Germany

[73] Assignee: Deutsche Thomson Brandt GmbH, Villingen-Schwennigen, Germany

[21] Appl. No.: 647,846

[22] Filed: May 3, 1996

[30] Foreign Application Priority Data

May 23, 1995 [DE] Germany ............ 195 18 863.2

[51] Int. Cl.$^6$ ............................................. H02M 3/24
[52] U.S. Cl. ................ 363/21; 363/41; 363/49; 363/89; 363/97; 363/131; 363/147
[58] Field of Search ....................... 363/19, 21, 49, 363/147, 41, 89, 131, 97

[56] References Cited

U.S. PATENT DOCUMENTS

| | | |
|---|---|---|
| 4,694,385 | 9/1987 | Marinus .................. 363/19 |
| 4,937,727 | 6/1990 | Leonardi ................. 363/97 |
| 5,390,100 | 2/1995 | Palata .................... 363/19 |

FOREIGN PATENT DOCUMENTS

| | | | |
|---|---|---|---|
| 3637015 | 5/1987 | Germany | H04N 5/63 |
| 3731645 | 3/1989 | Germany | H02M 3/04 |

*Primary Examiner*—Peter S. Wong
*Assistant Examiner*—Shawn Riley
*Attorney, Agent, or Firm*—Joseph S. Tripoli; Frederick A. Wein

[57] ABSTRACT

An integrated circuit achieves a burst mode standby operation for a switched-mode power supply by driving a switching transistor. One winding of a transformer is connected to inputs of two differently biased rectifier circuits and the sum of the output voltages of these circuits is applied to a control terminal of the integrated circuit.

8 Claims, 2 Drawing Sheets

SWITCHED-MODE POWER SUPPLY HAVING STANDBY OPERATION

BACKGROUND

The invention is based on a switched-mode power supply having standby operation.

A switched-mode power supply of this type, in particular for a television receiver or a video recorder, transmits, for example, a power of the order of magnitude of 80 to 120 watts during normal operation and operates at a switching frequency of approximately 40 to 100 kHz. During standby operation, the switched-mode power supply transmits a greatly reduced power of the order of magnitude of 0.5 to 5 watts. In order to ensure stable operation with such a small power, the operating frequency, that is to say the frequency at which the switching transistor is switched on and off, is reduced to values of the order of magnitude of 6 kHz. However, such a low operating frequency lies within the audible range and can therefore produce audible interference signals.

It is known to operate she switched-mode power supply during standby operation in a so-called burst mode. In this burst mode, for example during a period of 50 to 100 Hz, the switching transistor is switched at a frequency of 40 to 100 kHz during part of the period and remains in the off state during the majority of this period. The considerable reduction in the power transmitted by the switched-mode power supply is therefore achieved by virtue of the fact that the power transmission is interrupted for the majority of the time.

A burst mode of this type consequently requires special circuit measures to control the switching transistor. On the other hand, it is known to drive the switching transistor directly by means of an integrated circuit, which supplies the switching voltage for the switching transistor at its output. Known and inexpensive circuits of this type are often not readily able to carry out the burst mode that has been described. Additional peripheral circuits are then required for the burst mode.

SUMMARY

The invention is based on the object of providing a simple circuit for realizing the burst mode for the switched-mode power supply, which circuit can be used to the greatest possible extent for any type of circuitry.

This object is achieved by means of the invention specified in claim 1. Advantageous developments of the invention are specified in the subclaims.

In the case of the invention, therefore, one winding of the transformer is connected to the inputs of two rectifier circuits of opposite polarity and the sum of the output voltages of these rectifier circuits is applied to a control terminal of the circuit. The two rectifier circuits preferably have different time constants in this case.

In the circuit according to the invention, the greatly different shape of the pulse at the transformer during normal operation, on the one hand, and standby operation, on the other hand, is thus advantageously utilized to obtain a control voltage for the burst mode. The invention at the same time has a number of advantages.

The circuit can be used for a wide output power range, since in automatically adapts to the respective pulse shape and pulse amplitude at the transformer. The circuit acquires high stability and the generation of signals in the audible range is avoided. The circuit can be used virtually for all types of integrated circuit without modifying the latter. The outlay on circuitry is low and, in one exemplary embodiment, comprises only five additional components in the form of resistors, capacitors and diodes. The circuit does not require any critical setting.

Preferably, the outputs of the two rectifier circuits are connected to one another via a resistor, and one of the outputs is connected via a diode to the control input of the integrated circuit. A rectifier circuit which is already present for generating the control voltage for the stabilization of the generated operating voltage is preferably utilized as one of the rectifier circuits. This solution means that only a few additional components are required.

The sum of the output voltages of the two rectifier circuits and the control voltage for the stabilization of the output voltages are preferably applied to the same control input of the integrated circuit. The time constant of the rectifier circuit for the negative voltage is preferably appreciably smaller than the time constant of the rectifier circuit for the positive voltage.

According to a development of the invention, a circuit is provided which limits the maximum turn-on time of the switching transistor in the burst mode. In this case, the sum of the output voltages of the two rectifier circuits is preferably applied to the base of a transistor, the emitter of which is earthed via a first capacitor and is connected via a second capacitor to a further control terminal of the integrated circuit. The further control terminal of the integrated circuit is in this case preferably connected via a further resistor to an output of the mains rectifier.

The invention is explained below with reference to the drawing, in which

DESCRIPTION OF THE PREFERRED EMBODIMENT(S)

Figure 1:
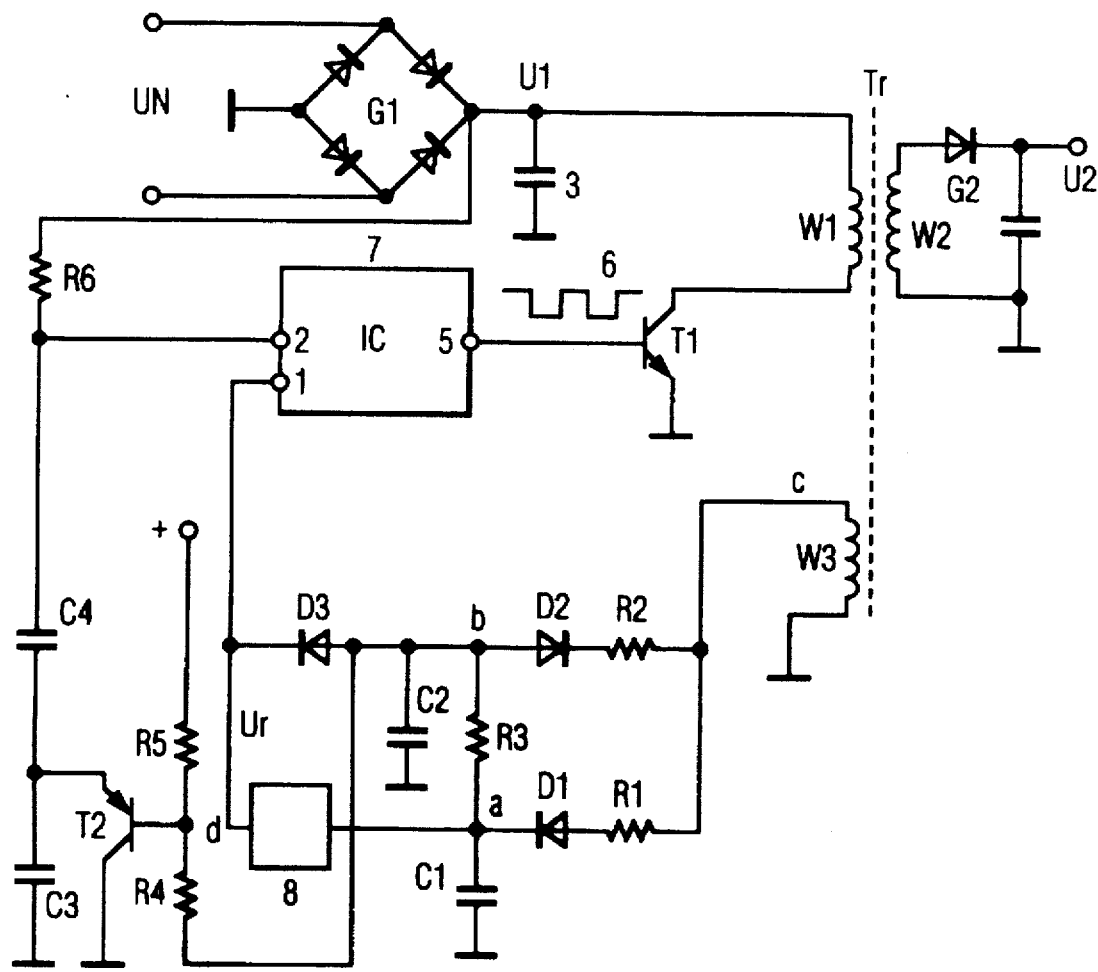
FIG. 1 shows a switched-mode power supply using the circuit according to the invention.
Figure 2:
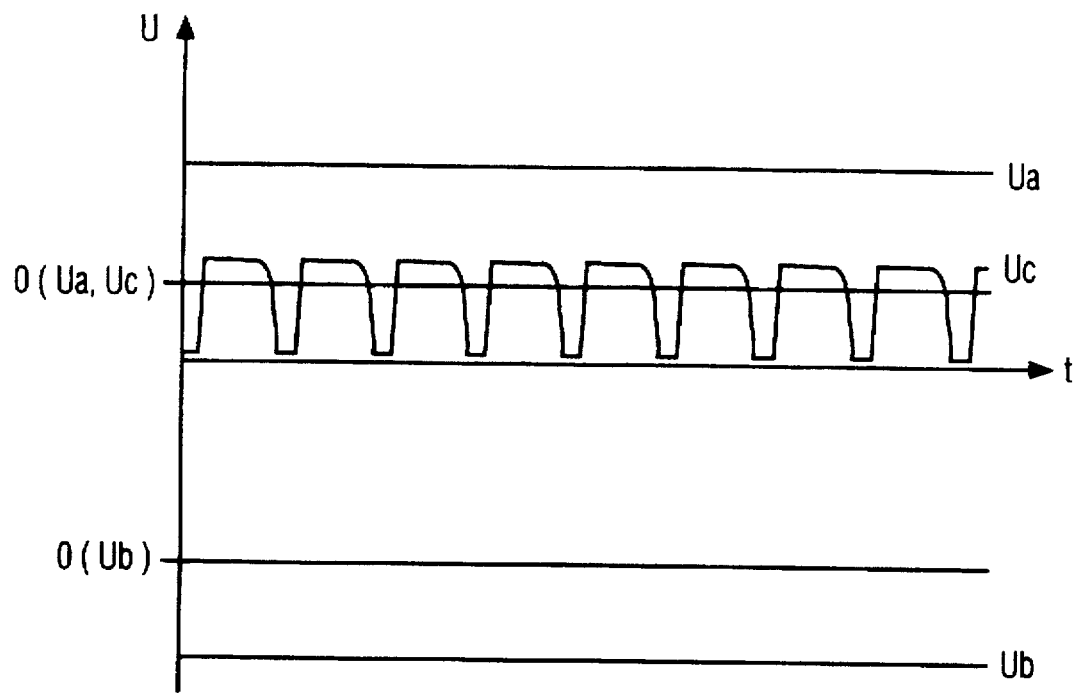
FIG. 2 shows voltage characteristics for normal operation.
Figure 3:
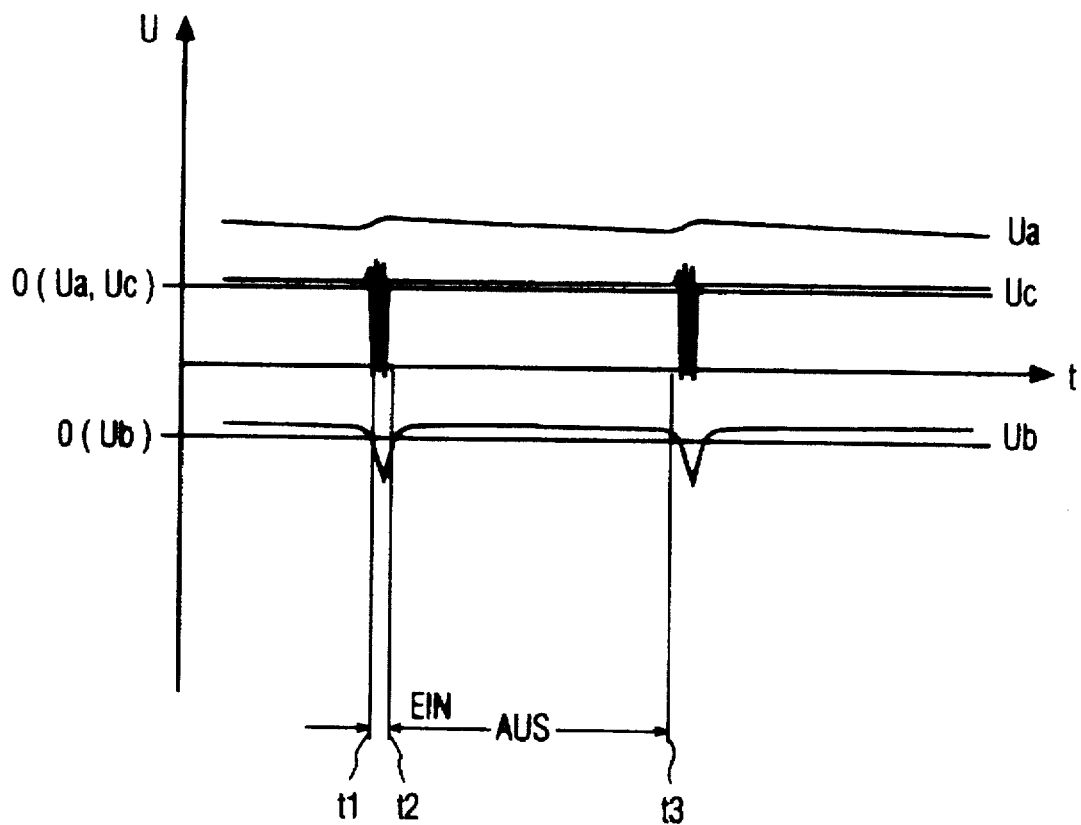
FIG. 3 shows voltage characteristics for standby operation.

The small letters a–c indicate those points in FIG. 1 at which the voltages Ua, Ub, Uc according FIGS. 2, 3 are present.

FIG. 1 illustrates the mains voltage UN, the mains rectifier G1, the charge capacitor 3, the isolating transformer Tr with the primary winding W1 and the secondary winding W2, the rectifier G2 for generating the operating voltage U2, the switching transistor T1 and the integrated circuit 7 which supplies the switching voltage 6 for the switching transistor T1. The winding W3 is connected to the input of a rectifier circuit having the diode D1 and the capacitor C1. This rectifier circuit supplies, at its output a, a voltage which is determined by the positive component of the pulse at the point c and is constant to the greatest possible extent owing no the long time constant R1×C1. The voltage passes from the point a via the control loop 8 to the control input 1 of the integrated circuit 7 and effects stabilization of the generated operating voltage U2. The time constant of this rectifier circuit is approximately 10 ms. A further pin 2, which constitutes a further control input of the circuit 7, is connected via the resistor R6 to the output of the mains rectifier G1 and via the capacitor C4 to earth. The circuit described thus far is known.

The point c is now additionally connected to a second rectifier circuit having the diode D2 and the capacitor C2. This second rectifier circuit produces, at the point b, a negative DC voltage whose value is proportional to the amplitude of the negative component of the pulse at the point c. The resistor R3, which connects the two outputs a and b of the rectifier circuits to one another, ensures that the sum of the output voltages of the two rectifier circuits is present at the point b. This output is likewise connected to the control input 1 of the integrated circuit 7 via the diode D3. The time constant of this second rectifier circuit is approximately 1 ms or less.

FIG. 2 shows the voltages Ua, Ub, Uc at the points a, b, c for normal operation. In this case, the voltages are illustrated with different zero lines and different scales. The zero line of a voltage is respectively indicated by the bracketed expressions. The DC voltage Ua, which is constant to the greatest possible extent, is present at the point a. The negative voltage generated by D2 is added to this voltage. This produces the voltage Ub of about −14 volts at the point b. The diode D3 remains reverse-biased due to this negative voltage. The voltage at the point b then has no effect on the control input 1 of the integrated circuit 7. The input 1 then receives only the control voltage Ur for stabilization.

FIG. 3 once again shows the voltages as in FIG. 2, but for standby operation. During standby operation, the power transmitted by the switched-mode power supply is greatly reduced. The time during which a negative voltage is present at the point c, in other words the time during which T1 is switched on, is therefore considerably reduced. As a result, the negative voltage generated by D2 becomes significantly smaller. The positive voltage Ua, generated by D1, at the point a is not subject to this change. The addition of the two voltages Ua and Ub now no longer produces a negative voltage at the point b, as in FIG. 2, but rather a positive voltage. This positive voltage Ub makes the diode D3 conduct and passes to the control input 1 of the integrated circuit 7. As a consequence of this, the integrated circuit 7 is inhibited on account of overshooting and no longer supplies the switching voltage 6 for the transistor T1. The switching operation is then interrupted, with the result that a pulse voltage no longer occurs at the point c. This is the status from t1 to t3 in FIG. 3. Since a signal no longer passes from the point c to the diode D2 and the time constant R1×C1 is relatively long, hysteresis is produced in the sense that the control input 1 is greatly overdriven.

Since a pulse voltage is no longer present at the point c, the capacitor C1 is discharged, with the result that the voltage Ua drops. When this positive voltage Ua has dropped below a specific value, the diode D3 is finally reverse-biased again. The integrated circuit 7 then begins to operate again and once more generates the switching voltage 6. The period of time during which the switching voltage 6 is present and effects switching operation is designated by t1 to t2 in FIG. 3. Since the pulse voltage Uc is now present again at the point c, the capacitor C1 is charged again until, at the instant t2, the voltage Ub is once again so large that the diode D3 conducts again and switches off the circuit 7 and thus the switching voltage 6.

In other words: during normal switching operation of the switching transistor, a voltage is established from the pulse voltage of the transformer, via the two rectifier circuits, which switches off the circuit, and hence the switching voltage for the switching transistor, after a certain period of time, namely an the end of the ON time of the burst mode. The OFF time of the burst mode begins with the switching off of the circuit and the loss of the switching voltage 6. A voltage is no longer fed to the two rectifier circuits during this OFF time. Due to the discharging of the charge capacitors of the two rectifier circuits, the aggregate voltage of the latter changes in such a way that, finally, the circuit is switched on again at the end of the OFF time and the switching operation of the switching transistor starts again.

The frequency of the switching voltage 6 is about 45 kHz and thus lies above the audible range. The burst frequency, that is to say the frequency corresponding to the period t1 to t3, is essentially determined by the capacitor C1 and is approximately 50 Hz.

The voltage Ub is additionally connected to the voltage divider R4/R5, the centre point d of which is connected to the base of the transistor T2. The emitter of the latter is earthed via the capacitor C3 and is connected via the capacitor C4 to the control terminal 2 of the circuit 7 and via the resistor R6 to the output of the mains rectifier G1. This additional circuitry serves to limit the maximum turn-on time of the switching transistor T1 during the ON time of the burst mode and operates as follows:

The voltage across the capacitor C1 is in each case too low at the beginning of a burst, that is to say at the beginning of the ON time of the burst mode, and the circuit 7 then goes to the maximum turn-on time, which is determined by the time constant of the resistor R6 and the capacitor C4. The large current flowing in this case in the switching transistor T1, which current can rise up to 4 A, again produces the problem of audible interference at 50 Hz. The illustrated circuit R4, R5, T2, C3, C4, R6 serves to overcome this disadvantage. During normal operation, the transistor T2 is in the on state, to be precise it is saturated, since its base is negatively biased by the voltage Ub from the capacitor C3. The capacitor C4 is then connected to earth, and its value determines the time constant of the current simulation for the drain path. During standby operation, the base of the transistor T2 is connected via the resistor R5 to a positive stabilized DC voltage, with the result that the resistor T3 is then in the off state. The capacitance which is now connected to the pin 2 of the integrated circuit 7 is determined by the series circuit formed by the capacitors C4 and C3, and is approximately 0.89 nF. The time constant is now significantly shorter than during normal operation, and as a result the maximum turn-on time of the switching transistor T1 is, in a desirable manner, only about 3 µs and the maximum collector current of this transistor is about 1.8 A.

The circuit which has been described and is peripheral to the integrated circuit 7 can also be integrated in the integrated circuit 7. In the case of the integrated circuit of the TDA 4605 type used in FIG. 1, an input of the integrated circuit that is already present, in particular the pin 8=zero cross detector, can be used for this purpose.

We claim:

1. A switched-mode power supply having standby operation with a burst mode, comprising:
   a transformer including a primary winding and a secondary winding, a switching transistor coupled in series with said primary winding, an integrated circuit for controlling said switching transistor, a first rectifier circuit coupled to a terminal of a third transformer winding and generating a control voltage for said integrated circuit, a second rectifier circuit providing a voltage of opposite polarity with respect to said first rectifier circuit and having a time constant which is appreciably shorter than a time constant of the first rectifier circuit, and the outputs of the two rectifier circuits being coupled together to produce a sum voltage, the sum voltage being coupled to a control input of the integrated circuit for inhibiting operation of the integrated circuit in case of a standby condition periodically caused by an overshooting at a time depending upon the time constant of the first rectifier circuit.

2. The power supply according to claim 1, wherein the outputs of the two rectifier circuits are coupled to one another via a resistor, and said sum voltage is coupled via a diode to the control input of the integrated circuit.

3. The power supply according to claim 2, wherein said sum of the two output voltages and said control voltage are coupled to the same control input of the integrated circuit.

4. The power supply according to claim 3, wherein inputs of said first and second rectifier circuits are coupled to a same winding.

5. The power supply according to claim 4 wherein the two time constants are approximately 1 ms and 10 ms.

6. The power supply according to claim 1, wherein a circuit is provided which limits the maximum turn-on time of the switching transistor in the burst mode.

7. The power supply according to claim 6, wherein the sum of the output voltages is applied to the base of a transistor, the emitter of the transistor being coupled via a first capacitor to ground and coupled via a second capacitor to a further control terminal of the integrated circuit.

8. The power supply according to claim 7, wherein said control terminal of the integrated circuit is coupled via a resistor to an output of a mains rectifier.

* * * * *